US010872416B2

(12) United States Patent
McNerney et al.

(10) Patent No.: US 10,872,416 B2
(45) Date of Patent: *Dec. 22, 2020

(54) OBJECT ORIENTED IMAGE EDITING

(71) Applicant: Google LLC, Mountain View, CA (US)

(72) Inventors: Peter Joseph McNerney, Frederick, CO (US); Nolan Andrew Miller, Kirkland, WA (US)

(73) Assignee: Google LLC, Mountain View, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/266,609

(22) Filed: Feb. 4, 2019

(65) Prior Publication Data
US 2019/0236786 A1    Aug. 1, 2019

Related U.S. Application Data

(63) Continuation of application No. 15/420,652, filed on Jan. 31, 2017, now Pat. No. 10,198,820, which is a
(Continued)

(51) Int. Cl.
*G06T 7/11* (2017.01)
*G06K 9/62* (2006.01)
(Continued)

(52) U.S. Cl.
CPC ............ *G06T 7/11* (2017.01); *G06K 9/00221* (2013.01); *G06K 9/00664* (2013.01);
(Continued)

(58) Field of Classification Search
CPC ... G06T 7/0081; G06T 11/60; G06K 9/00221; G06K 9/3233
See application file for complete search history.

(56) References Cited

U.S. PATENT DOCUMENTS 5,526,020 A * 6/1996 Campanelli ......... G06F 3/04842
345/157
5,990,901 A * 11/1999 Lawton .................. G06T 15/503
345/581

(Continued)

FOREIGN PATENT DOCUMENTS

| EP | 1826723 | 8/2007 |
|----|---------|--------|
| EP | 1826724 | 8/2007 |
| JP | 2005258679 | 9/2005 |

OTHER PUBLICATIONS

First Action Interview—Pre-Interview Communication in U.S. Appl. No. 15/420,652, 10 pages, dated May 18, 2018.
(Continued)

*Primary Examiner* — Utpal D Shah
(74) *Attorney, Agent, or Firm* — Lisa Benado; IP Spring

(57) ABSTRACT

Implementations generally relate to object based image editing. In some implementations, a method includes segmenting an image into object data by identifying one or more object classifications in the image and storing at least one locator for one or more regions of the image corresponding to each instance of the object classification. The method further includes receiving a selection of a representative portion of the segmented image from a user, and matching the representative portion with the object data to determine at least one matched object classification associated with the representative portion. The method further includes presenting the user with one or more of the matched object classifications for the user to instruct one or more edit operations to be applied to at least one object represented by the matched object classification.

20 Claims, 14 Drawing Sheets

Related U.S. Application Data continuation of application No. 14/626,063, filed on Feb. 19, 2015, now Pat. No. 9,569,697.

(51) Int. Cl.
| | | |
|---|---|---|
| *G06K 9/46* | (2006.01) | |
| *G06T 11/60* | (2006.01) | |
| *G06K 9/32* | (2006.01) | |
| *G06K 9/00* | (2006.01) | |
| *G06T 5/00* | (2006.01) | |

(52) U.S. Cl.
CPC ............ *G06K 9/3233* (2013.01); *G06K 9/46* (2013.01); *G06K 9/6215* (2013.01); *G06K 9/6267* (2013.01); *G06T 5/00* (2013.01); *G06T 11/60* (2013.01); *G06K 2009/4666* (2013.01); *G06T 2207/20012* (2013.01); *G06T 2207/20104* (2013.01); *G06T 2207/30201* (2013.01)

(56) References Cited

U.S. PATENT DOCUMENTS

| | | | | |
|---|---|---|---|---|
| 8,175,384 | B1* | 5/2012 | Wang | G06T 7/194 |
| | | | | 348/586 |
| 8,345,921 | B1* | 1/2013 | Frome | G06K 9/72 |
| | | | | 382/103 |
| 8,391,594 | B1* | 3/2013 | Wang | G06T 7/194 |
| | | | | 382/100 |
| 8,422,735 | B2* | 4/2013 | Kim | G06K 9/00288 |
| | | | | 382/103 |
| 8,571,271 | B2 | 10/2013 | Yuan et al. | |
| 8,594,428 | B2 | 11/2013 | Aharoni et al. | |
| 2003/0072488 | A1* | 4/2003 | Barsness | G06Q 10/107 |
| | | | | 382/181 |
| 2006/0280380 | A1 | 12/2006 | Li et al. | |
| 2007/0019943 | A1 | 1/2007 | Sueyoshi et al. | |
| 2008/0150946 | A1* | 6/2008 | Kuo | G06T 7/13 |
| | | | | 345/442 |
| 2008/0180459 | A1* | 7/2008 | Jung | H04N 1/00864 |
| | | | | 345/647 |
| 2008/0181533 | A1* | 7/2008 | Jung | G06K 9/3241 |
| | | | | 382/283 |
| 2012/0051658 | A1* | 3/2012 | Tong | G11B 27/034 |
| | | | | 382/224 |
| 2012/0307096 | A1 | 12/2012 | Ford et al. | |
| 2013/0120439 | A1* | 5/2013 | Harris | G06T 13/80 |
| | | | | 345/619 |
| 2013/0141605 | A1 | 6/2013 | Kim | |
| 2013/0272610 | A1* | 10/2013 | Ogishi | G06K 9/6267 |
| | | | | 382/175 |
| 2014/0050419 | A1 | 2/2014 | Lerios et al. | |
| 2014/0133782 | A1 | 5/2014 | Adver et al. | |
| 2014/0176663 | A1* | 6/2014 | Cutler | H04N 7/147 |
| | | | | 348/14.07 |
| 2014/0184858 | A1* | 7/2014 | Yu | H04N 5/23293 |
| | | | | 348/241 |

OTHER PUBLICATIONS

Notice of Allowance in U.S. Appl. No. 15/420,652, 24 pages, dated Sep. 27, 2018.

* cited by examiner

| | |
|---|---|
| Tree | Details Filter |
| Person 1<br>Name: Stanley | Blemish Removal |
| Person 2<br>Over Age 70 | Smoothing |
| Car | Paint Red |

FIG. 7(a)

| | |
|---|---|
| Male | Teeth Whitener |
| Over Age 70 | Smoothing |
| Name: Stanley | Blemish Removal |

FIG. 7(b)

OBJECT ORIENTED IMAGE EDITING

RELATED APPLICATIONS

This application is a continuation of, and claims priority to, U.S. patent application Ser. No. 15/420,652, filed Jan. 31, 2017, which is a continuation of, and claims priority to, U.S. patent application Ser. No. 14/626,063, filed Feb. 19, 2015, which issued as U.S. Pat. No. 9,569,697 on Feb. 14, 2017, the contents of which are incorporated herein by reference in their entirety.

BACKGROUND

The popularity and convenience of digital cameras as well as the widespread of use of Internet communications have caused user-produced images such as photographs to become ubiquitous. Manual image editing systems for various consumer electronic devices and personal computers enable a user with knowledge and know-how to manipulate images. Such image editing systems typically require the user to understand complicated and difficult instructions to manipulate the image.

SUMMARY

Implementations generally relate to editing portions of an image defined by objects appearing in the image. In some implementations, a method includes segmenting an image into object data representing the objects depicted. The segmentation includes identifying one or more object classifications in the image and storing at least one locator for one or more regions of the image corresponding to each instance of the object classification. Implementations further include receiving a representative portion of the segmented image, such as from a user sending a representation to indicate the object that is subject to editing. The representative portion is matched with the object data to determine at least one matched object classification associated with the representative portion. In some implementations, the matched object classification may be presented to the user for the user to provide instructions to apply one or more edit operations to at least one object represented by the matched object classification. One or more edit operations may be received from the user to be applied to at least one object represented by the matched object classification. In some implementations, the instruction is received and, in response, one or more instances of the object in the image are edited according to the edit operations.

In some aspects, the method includes generating a mask corresponding to the matched object classification. The mask may be based on the at least one locator for matched the object classification. In some implementations, the mask corresponding to the matched object classification may be displayed to the user to present the matched object classification. The mask may highlight the chosen object(s) to give feedback to the user regarding the matched object classification. In still further implementations, segmentation may include dividing at least one of the object classifications into one or more sub-object classifications, which may be included in presenting the matched object classification. The object classification and sub-object classification may be presented in hierarchical sequential order in response to a user request. Some implementations may further include that the one or more objects classifications obtained from segmentation is presented to the user from which the user may respond and select a representative portion of the image.

With further regard to the method, in some implementations, the edit operations that are applied to the chosen object or objects are stored along with the corresponding object classification of the edited object. In these cases, a second image may be edited by applying the stored edit operations if the second image is determined to also display an object of the object classification edited in the prior image. The edit operations may be duplicated for any images having comparable objects of the same object classification. In some implementations, the user may be presented with one or more recommended edit operations based on the matched object classification. For example, a particular object classification that matches the object chosen for editing is cross referenced with particular edit operations that are preferred for the objects of the classification type.

In still other implementations, a tangible, non-transient recordable, computer-readable storage device, such as medium, is discussed to store instructions that cause performance of operations. The non-transitory computer-readable medium stores instructions that, when executed by one or more processors, cause the one or more processors to perform actions that include segmenting an image into object data. The segmentation operation may be performed by identifying one or more object classifications in the image and storing at least one locator for one or more regions of the image corresponding to each instance of the object classification. Further operations may include receiving a selection of a representative portion of the segmented image from a user, matching the representative portion with the object data to determine at least one matched object classification, and presenting the user with one or more of the matched object classifications.

In some implementations, one or more instructions may be received from the user to apply one or more edit operations to at least one object represented by the matched object classification. One or more edit operations may be received from the user to be applied to at least one object represented by the matched object classification and further the object may be edited according to the edit operations.

In response to the instruction, the at least one object in the image may be edited. In some implementations, the operations may additionally include generating a mask corresponding to the matched object classification and based on the at least one locator for the matched object classification. In these implementations, the presentation of matched object classification may be in the form of displaying the corresponding mask. Additional actions may include dividing at least one of the object classifications into one or more sub-object classifications. In these implementations, the presentation of matched object classification may include the one or more sub-object classifications. Such object classifications and sub-object classifications may be presented, in some implementations, in hierarchical sequential order in response to a user request.

In still some implementations, actions performed by the computer readable medium further includes presenting the identified object classification to the user, and where the selection of a representative portion is in response to the presenting of the identified object classification. Additional actions may include storing the edit operations applied to the at least one object and storing the corresponding object classification of the edited object. In such implementations, operations may further include providing a second image and applying the edit operations to at least one object in the second image having the stored object classification. In still some implementations, actions may include presenting the user with recommended edit operations based on the matched object classification.

In yet some implementations, an object based editing system is provided in which one or more processors may execute one or more computer-readable media having instructions stored thereon that cause performance of multiple operations, such as an application. Such operations may include segmenting an image into object data by identifying one or more object classifications in the image and storing at least one locator for one or more regions of the image corresponding to each instance of the object classification, receiving a selection of a representative portion of the segmented image from a user, matching the representative portion with the object data to determine at least one matched object classification, and presenting the user with one or more of the matched object classifications. Some implementations may further include receiving an instruction from the user to apply one or more edit operations to at least one object represented by the matched object classification, and in response to the instruction, editing the at least one object in the image. In some implementations, the medium instructions may further cause a mask to be generated corresponding to the matched object classification and based on the at least one locator for the object classification, and displayed as the form of the presentation of matched object classification. The medium instructions may further cause dividing of the at least one object classification into one or more sub-object classifications. In these cases, the presenting of matched object classification may include the one or more sub-object classifications. The medium may further include instructions to present to the user, the object classification identified by object segmentation of the image. In these implementations, the selection of a representative portion may be in response to the presenting of the identified object classification.

BRIEF DESCRIPTION OF THE DRAWINGS

FIGS. 7(a) and (b) are block diagrams of various examples of object based edit stacks.

DETAILED DESCRIPTION

In various implementations, an object based editing system provides a tool for editing portions of an image that depict particular visual objects. The images may be pictures that have been created or copied and stored in electronic form, such as photographs, videos, electronic drawings or paintings, among others. In various implementations, the system prepares the images for editing by segmenting the image into logical, specific two-dimensional objects which represent the physical three-dimensional objects depicted in the image. The objects are assigned classifications according to the objects' semantic names. The system then determines and stores locators for the instances of the object classifications in the image.

As described in more detail below, implementations present the object classifications to the user for selection of an object in the image. The user is enabled to reliably select one or multiple objects of choice according to the object classifications without the need for lassos, tracing, dragging, wands, scribbling, adding or subtracting within a selection, intersecting or cloning selections, and similar techniques.

In some implementation, the user selects a representative portion of the image, which is then matched with an object classification and its location. In some implementations, the present editing system provides the user with choices of object classifications found to be in the image. Implementations are particularly applicable to a user who desires control over the editing process and yet can benefit from an easy to use tool. For example, if the user desires to add sparkles to one or more trees depicted in a photograph for a customized holiday card, then an editing tool that recognizes and permits easy selection of the tree would be beneficial. If the user edits this example image on a mobile device with a touch pad screen, then tracing each of multiple trees for editing may be tedious and prone to error.

In the example, more challenges may arise should the user desire to edit various types of trees in the image with an editing tool that simply recognizes color differences without identifying the trees as objects. In some implementations, multiple instances and various subcategories of an object classification may be presented to the user for a more varied selection of objects to choose. In this example, a benefit to object identification is in discriminating different types of foliage or anomalies that create blurred edges, such as snow covered trees or fog in the image.

In some implementations, the system provides the user with well-informed editing options adapted to the object of interest. In this manner, implementations provide the user with a natural and intuitive environment for editing. For example, the user may be presented with an editing option of adding sparkles, among other filters, effects and tools often used for editing trees and in the context of creating greeting cards.

Figure 1:
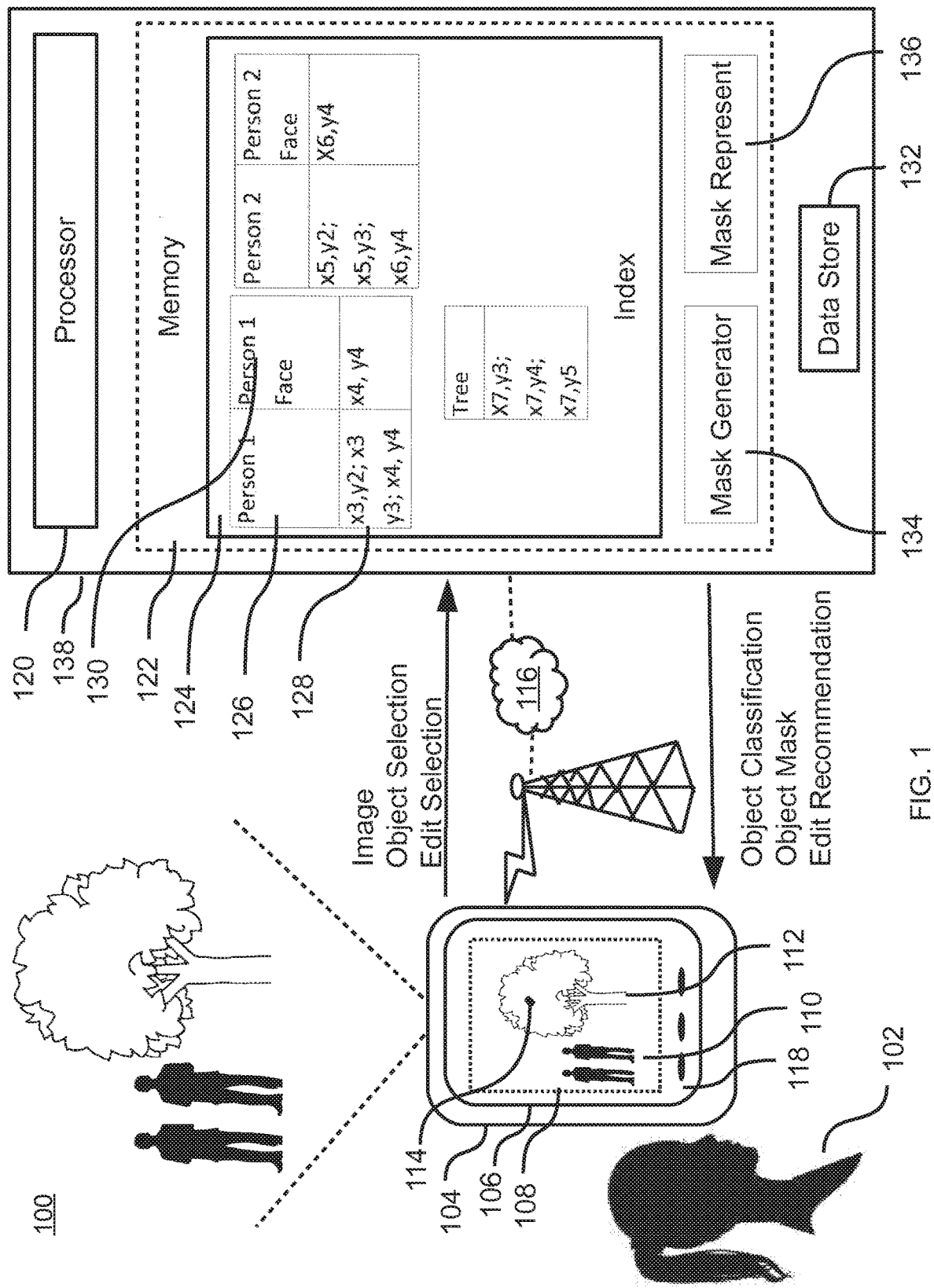
FIG. 1 is a conceptual diagram illustrating an example environment in which various aspects of object segmentation can be implemented in an object based editing system.

FIG. 1 illustrates an example environment in which to implement some embodiments of an object based editing system 100 to enable a user 102 to select objects and then edit those objects. The system 100 includes an editing device 104 and a computing device 138, which communicate with each other across a network 116 to implement the object based image editing tool.

The user 102 may be interested in using the system 100 for any casual to high end image editing. The system 100 makes it easy for the user to be involved in making object selections and choosing editing operations. Yet, editing images with the system 100 does not necessarily entail a great amount of manual labor by the user. Nor, does the system 100 require precise use and knowledge from the user to select the pixels of an image region to edit and to apply the edits. Moreover, in some implementations, the user need not possess high level expertise to decide from among a multitude of available edit operations for the one or few edit operations that may be suitable for the object selection.

In the example shown by FIG. 1, the user 102 of an editing device 104 has captured an image 108 depicting one or more kinds of objects. In this case, the objects are a tree 112 and two instances of persons 110. The editing device 104 displays the image on a display screen 106 having a graphical user interface 118. A smartphone type editing device 104 is shown. Other types of devices are applicable for use with the current system, e.g. personal digital assistant, a digital still camera, digital video camera, personal navigation device, a wrist watch and other wearable computers, among other mobile devices. The editing device 104 in accordance with various embodiments may be any computing device capable of displaying and editing images as well as determining and processing input, with or without image capture elements. For example, the object based editing system is useful with notebook computers, a laptop computer, a netbook, desktop computers, game console, among devices capable of editing images.

Display screen 106 on the editing device 104 may be used to display various user interfaces. The display screen may be a TFT (thin-film transistor) liquid crystal display, an OLED (organic light emitting diode) display or other suitable display technology. Mobile devices having diminutive screen sizes especially benefit from the simple to use editing tool of the editing system 100. It will be appreciated that edit devices having larger screens may also be better utilized by exploiting the image manipulation of the editing system 100. The user interface displayed on display screen 106 may receive commands from a user, convert them for use by a processor in the editing device 104, and transmit them to, for example, the computing device 138 through an external interface.

In some implementations, the editing device 104 transmits an image 108 to the computing device 138 for processing. The image 108 may be captured using an image capture element of the user editing device 104, as shown in FIG. 1, or acquired by other means, such as by downloading from another device. In the example shown, the computing device receives and stores the image 108 in a data store 132.

The editing device 104 may transmit to computing device 138 a request to process the image by object segmentation during a processing phase in which the image is prepared for editing during an editing phase. In another implementation, the processing of the image into object segmentation may be performed directly on the editing device 104, in which case components of the computing device 138 for object segmentation are provided in the editing device 104.

In some implementations, the computing device 138 begins pre-processing the image into its segmented objects prior to editing, with or without having received a request, or prior to receiving a request from the editing device 104. In further implementations, the image may be automatically sent by the editing device 104 or other storage medium and received by the computing device 138. For example, pre-processing may be triggered by the user opening the image in an editing application on the editing device 104. In some instances, the image is already processed in a pre-processing stage prior to beginning to edit the image, such as prior to a user selecting a portion of the image during the editing phase.

One benefit of beginning the pre-processing stage prior to the editing phase is reduced latency. The heavy computational steps of image segmentation may be separate from the editing. The benefit may be realized, at least to some degree, even where a portion of the two phases overlap in time. For example, if a user begins the editing phase, such as sending instructions to edit a portion of the image or selecting objects to edit, while the image is still being segmented and processing has not yet been completed, the user still may experience time savings, compared to a scenario in which the editing phase entirely begins prior to processing the image. In some cases, the user may experience just a minor delay as the object segmentation completes. However, in still other implementations, image segmentation begins at the same time as a selection of an image portion to edit.

During the processing, the computing device 138 processor 120 analyzes the image to identify, classify, and localize objects shown in the image and to collect the pixel locations that make up the objects. Pixels are the finest level of granularity for a given resolution of an image. The image is segmented into its visual components as object classifications 126 and corresponding locators 128, and this object data is stored in an object index 124 in memory 122. In some implementations, the index is in the form of a look up table. In the example shown, objects 110, 112 are identified as object classifications. The object classification is a word or words that provide distinctive designation to the object.

Various combinations of object recognition processes may be utilized to identify objects represented in the image by the object's classification type to create the object index 124. A combination of multiple object recognition processes may be utilized to segment the image into a variety of different specific objects with only generic objects remaining for further image segmentation. For example, tree and sky segmentation, face detection, facial recognition, a variety of learning techniques such as neural network processes, and other processes or combinations of processes to segment objects may be used. The object recognition processes may be specific for the type of images being processed. For example, nature images may be processed with object recognition techniques that detect objects commonly found in nature. Such recognition algorithms may be integral to system 100. System 100 may also access recognition algorithms provided by software that is external to system 100 and that system 100 accesses.

In some implementations, in order to recognize an object, system 100 may compare the object (e.g., image of the object) and match the object to reference images of the object. In some implementations, system 100 may search reference images in order to identify any one or more reference images that are similar to the object in the image. In some implementations, for a given reference image, system 100 may extract features from the image of the object in an image for analysis, and then compare those features to those of one or more reference images. For example, system 100 may analyze the relative position, size, and/or shape of object features such as facial characteristics, body characteristics, etc. In some implementations, system 100 may use data gathered from the analysis to match the object in the image to one more reference images with matching or similar features. In some implementations, system 100 may normalize multiple reference images, and compress object data from those images into a composite representation having information (e.g., object feature data), and then compare the object in the image to the composite representation for facial recognition.

In some scenarios, the object in the image may be similar to multiple reference images associated with the objects in the same category. As such, there would be a high probability that the object associated with the object in the image is the same object associated with the reference images.

In some implementations, to facilitate in object recognition, system 100 may use geometric recognition algorithms, which are based on feature discrimination. System 100 may also use photometric algorithms, which are based on a statistical approach that distills an object feature into values for comparison. A combination of the geometric and photometric approaches could also be used when comparing the object in the image to one or more references.

Other recognition algorithms may be used. For example, system 100 may use recognition algorithms that use one or more of principal component analyses, linear discriminant analysis, elastic bunch graph matching, hidden Markov models, and dynamic link matching. It will be appreciated that system 100 may use other known or later developed recognition algorithms, techniques, and/or systems.

In some implementations, system 100 may generate an output indicating a likelihood (or probability) that the object in the image matches a given reference image. In some implementations, the output may be represented as a metric (or numerical value) such as a percentage associated with the confidence that the object in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a recognition algorithm. Various recognition algorithms and/or visual search systems may be used to recognize objects such as people, trees, sky, landmarks, logos, entities, faces, etc. in order to implement implementations described herein.

In some implementations facial recognition may be employed and the system 100 enables users of the social network system to specify and/or consent to the use of personal information, which may include system 100 using their faces in images or using their identity information in recognizing people identified in images. For example, system 100 may provide users with multiple selections directed to specifying and/or consenting to the use of personal information. For example, selections with regard to specifying and/or consenting may be associated with individual images, all images, individual photo albums, all photo albums, etc. The selections may be implemented in a variety of ways. For example, system 100 may cause buttons or check boxes to be displayed next to various selections. In some implementations, system 100 enables users of the social network to specify and/or consent to the use of using their images for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The recognized object may be assigned an object classification as one or more names that provide meaning to the specific distinguishable things in the image. In some embodiments, a classification may include a group of various subcategories 156 of increasing specificity related to the broad classification unit. For example, a classification of a person may be determined and further divided by hierarchical specificity according to gender, age, identification name subcategories. In the example shown, the "Person 1" classification also includes "Male", "Over Age 40", and "Stanley" subcategories. The term classification as used herein may include varying levels of subcategories under the basic classification term.

In some implementations, the computing device 138 further identifies sub-object classifications representing components of the object classifications. For example, an object classification of a person may also include components of face, eyes, mouth, teeth, shirt, etc. The object and sub-object classifications are stored in the index 124. In some implementations, sub-object classifications may be ordered in terms of degrees of specificity from the broad object classification to the smaller components of the object. Other ordering of sub-object classifications may rely upon popularity of the components for editing.

When a person views an image, such as a photograph or video, they generally do so in terms of the name of the objects represented, rather than the image's pixels. For example, a photograph may be described as a picture of a person, car, animal, or other object. Thus, various implementations of the object based editing system assists a user by interpreting an image in terms of its semantic names of objects.

Upon identifying objects and sub-objects during image processing, the computing device 138 may determine the corresponding location of the object classifications and store the locators in the object index 124. In some implementations, there is a separate locator for each instance of an object and sub-object classification. In an example implementation, the locators are map notations that point to the location of the object classification on the image. For example, the locator may include a collection of x and y coordinates corresponding to all pixel locations in a grid of pixels of the image that include the depiction of a particular object classification. Grouping a set of all object pixels in a locator ensures that the entire object is edited.

In other implementations, the object is identified at the object location by a shape template, e.g. rectangle, oval, typical of the shape of the object classification, which may be fitted with the pixels that form the object. In FIG. 1, the index 124 includes object classification 126 of a tree and locator 128 defined by coordinates (x7, y3), (x7, y4), and (x7, y5). The x coordinate refers to one length of the image's two dimensions and the y coordinate refers to the other of the images dimensions. Although the example of locators in FIG. 1 list a few "x" and "y" coordinates, in some implementations the locator may include numerous coordinates. For example, each coordinate may represent one of the pixel locations that, in total, make up the object. In still other implementations, each coordinate may represent a collection of more than one pixel within a section of a grid of the image.

The object index 124 stores object classifications, which may be further categorized into sub-object classifications in some implementations, and stores their associated locators from the image. In this manner, the pixels that make up the image may be distinguished in terms of the objects depicted in the image, for example, "face" pixels, versus "sky" pixels. Rather than editing strictly according to pixels, which do not have any intrinsic knowledge of the objects shown in the image, the object based editing system allows for editing by objects identified in the image.

In an example implementation, after an image has been segmented into its objects, the image is ready for editing. The editing device 104 communicates to the computing device 138 a selection of a representative portion of the image for editing. The selection may be performed by the user who is editing the image. In other implementations, the selection is made by another user, an application, etc. The user may select a region of the image through an input element. In some implementations, as shown in FIG. 1, the input element 114 is a touchscreen panel associated with the display that senses touching of the display 106, such as a tap on a location on the image on the touchscreen display. The input element 114 sends the information to the processor, which in turn, routes the information through the network 116 and to the computing device 138.

In some implementations, the user selects a representative portion of the image by entering the name of an object classification of an object depicted in the image, e.g. "automobile." For example, the user may type a classification term into a text box. When entering free-hand in this manner, the entered term may be cross-referenced with object classifications that are maintained in the object index 124 to find the entered object name. In some circumstances the entered term is different than the object classification, but may be a synonym or a compatible term for the object classification. In this case, a synonym database, subcategory database, or other such database of compatible terms may be cross referenced to determine the object classification. In an example implementation, the entered term, "automobile", is recognized as corresponding to the object classification "car" in the index 124. In another example, an entered term, "Appaloosa", is recognized as a subcategory of the object classification "horse." The index 124 may be dynamic and updated with the additional corresponding object classification or subcategory term.

In some implementations, the computing device 138 may provide the user of the editing device 104 a collection of one or more object and sub-object classifications identified in the image by segmentation during the processing phase. For example, the collection may be presented to the user through the editing device user interface as an icon for each object classification, a list of classifications, an audio listing, etc. The user may select from the collection of multiple object classifications by the various inputs described above, such as touching an icon of a particular classification. In this manner, the user may easily select all instances or various groupings of instances of an object type in an image with a single input, such as by one touch of an icon representing an object classification. In some implementations, the user may select an object and sub-object classification based on the image being edited and also expand the scope of editing to other images depicting the same object classification. For example, by selecting an object classification, other images in an album or file or other frames in a video containing the object classification may be edited in the same manner as the object being edited in the current image.

The user may interact with the editing device 104 through an input. Various inputs include, without limitation, touchscreen, switch input with an on-screen or external keyboard, head mouse, voice recognition, gesture recognition, facial recognition, movement tracker, eye movement tracker, smart buttons, trackball, track pen, pen tablet, pen, stylus, and hand mouse. The input may rely upon a user applying touch, voice, click, tap, type, gestures, movement (e.g. moving an eye, arm, body), and other actions. In some implementations, a user contacts the display screen 106 using a finger or stylus in order to select items displayed by the display screen 106. The user may enter text or activate control functions of the user editing device 104. The user may activate the touch screen functionality of the display screen 106 to select an object by contacting at least a portion of the object shown on the display screen. In this manner, a single tap of an object may provide for selection of the entire object or any of its sub-object components. In some embodiments, the user may make sequential one or more taps to select from multiple objects and sub-objects available for editing. For example, with each tap of the screen, another object or sub-object may be presented for the user to accept as its selection.

In response to receiving the selection, the computing device 138 may determine the object classification embodied in the selected representative portion of the image. Where a user selects a region on the image, the computing device may look up the coordinates for the selected region and determine if the coordinates match any of a collection of coordinates in any locator 128 for an object classification 126 in the object index 124. If there is a "hit", the coordinates for the representative selected region match coordinates in the index 124 for an object classification. The matched object classification may be presented to the editing device 104. The computing device 138 may communicate this object classification to the editing device 104.

In some implementations, the computing device 138 includes a mask generator 134 to further delineate a group of pixels in the image that form an object and a mask representation 136 to use in presenting the pixels in the image that define the object. In some implementations, the processing includes multiple levels of analyzing the image with several object recognition techniques to finely tune the locator with the location of the object. For example, the general region of the image that includes the object may be initially detected by a low level pre-processing stage process, such as objectness. Subsequently, an object mask may be generated to more precisely define the pixels that makeup the object in the image. In some implementations, such precise object detection processes may include iterative algorithms as in GrabCut techniques. The mask generator may include various known techniques for producing a mask, such as parameterized masks, GrabCut techniques, and other such processes. In various implementations, the mask, such as an alpha mask, serves to protect the unselected portion of the image, revealing the selected portion that includes an object available for editing. In some implementations, a mask may be produced and stored corresponding to each identified object classification listed in index 124 during the processing of the image, which may result in multiple masks generated. The mask corresponding to a matched object classification may be presented to a user, for example, by displaying the mask over the image. The mask is constructed to reveal the object positioned at the locators for the corresponding object classification. In some implementations, a mask may be generated specifically for and in response to the user's selection of a representative image portion. In this case, a mask is created for just the matched object classification and/or sub-object classification. One or more object masks representing one or more object classifications matching the user's selected image portion may be transmitted from computing device 138 to the editing device 104 through network 116.

A user may shift through the various masks representing object and sub-object classifications to select the object of interest for editing. In some implementations, the masks may be presented in hierarchical sequential order of the object and sub-object classifications. For example, the mask of an object classification defining a broad category of the object may be presented first, followed by masks representing sub-objects of the object in order of increasing specificity. In some implementations, the various masks are presented in order of typical popularity of the objects and sub-objects for editing. Thee various mechanisms through which a user may request further object classification masks to appear, such as by touching an icon of an object classification, sequential tapping the display screen to request a next mask, activating a "next" element, choosing from a list, moving a scrollbar, flipping pages, using voice command, activating a remote controller, among other selection techniques. When the mask the user prefers is displayed, the user may choose the object classification associated with that preferred mask by various selection techniques previously described. In still other implementations, objects and sub-objects may be presented in various manners, such as by sequentially highlighting the object and sub-objects on the image, providing the semantic name of the object and sub-object, etc.

Implementations present effortless selection of objects that may otherwise be difficult to select due to blurred borders, multiple instances of objects with various colors, objects with colors similar to their surroundings, reflections, and the like.

In some implementations, edit recommendations may be provided based on and in response to the user selecting an object and/or sub-object classification. The computing device 138 may determine that certain edit operations, such as a particular filter or set of filters, are particularly suited and/or popular for the selected object or sub-object classification. Such preferred edit operations may be retrieved from a database of edit operations corresponding to each object classification. In some implementations, further criteria, such as context and purpose of the editing, are included to determine appropriate editing operations to recommend. In some implementations, the edit recommendations are variable and may be updated, such as according to current preferences of the user or a pool of users based on prior edit operation selections, or to revise the list with new edit operations available. For example, the recommended operations may adapt per object to match what a user is likely to desire based on historical use of edit operations by the user or pool of users for the particular object classification. Such historical use edit information may be stored in a database and categorized by object and sub-object classifications. The tailoring of edit tools to object classification may permit finely tuned recommendations that account for dissimilarities in the appearance of objects within a class, such as various types of objects within a classification, different color compositions, blurred borders, etc.

The recommendation of edit operations may be presented to the user in the form of icons, a menu list, voice commands, etc. The recommended operations that are presented may correspond to the object classification being presented to the user. For example, the 'display of a particular mask unveiling an object classification may trigger edit an operation recommendation list, e.g. filters, appropriate for that object classification to be provided as options for the user to choose.

The user may elect an operation from the recommended edit operations for the object and thus, instruct the computing device 138 to perform that edit operation, or the user may instruct a different operation, which is not in the edit recommendation list, to be performed. The computing device 138 or edit device applies the instructed edit operation to the object of the selected object and sub-object in the image. By the system 100 isolating discrete objects and or sub-objects from the image, the edit operation may be applied to transform just the selected object(s) or sub-object(s), rather than applying the operation to larger extraneous portions of the image, such as filtering the entire image. The computing device 138, edit device 104 or other storage medium may store the edited version of the image, as well as the original unedited image.

FIGS. 2(*a*) and (*b*) illustrate examples of processes for object segmentation that may be used in accordance with various embodiments. In the various implementations described herein, the processor of system 100 performs the steps described. In FIG. 2(*a*), an example of an object segmentation process 200 is shown. In block 202 of the process, an image is acquired, such as the computing device 138 receiving the image. The image may be acquired from the editing device 104, an internal or external storage medium, a social networking site, additional users, and other sources. In some implementation, the receiving of the image may coincide with launching of an editing application or opening of the image by the editing device 104.

In block 204, the processor 120 of the computing device 138 may identify an instance of an object classification and store the object classification in the object index 124 of the memory 122 of the computing device 138. In block 206 the processor further generates a locator for the identified object classification and stores the locator in the index 124. Decision block 208 determines if there are additional instances of the current object classification. If object segmentation process concludes that there are additional instances of the current object classification, the process proceeds back to step 206 to generate and store a locator for the other instance of the current object classification. The loop continues until all instances of the object classification are processed with a locator. If it is determined that there are no more instances of the current object classification, the process proceeds to decision block 210. The decision step of block 210 establishes whether there are additional object classifications in the image. If object segmentation process concludes that there are additional object classifications, the process proceeds back to step 204 to identify the additional object classification. However, if it is determined that there are no additional object classifications in the image, the object segmentation may proceed to alternative block 212 where the image is ready for editing, or may optionally proceed to a supplemental segmentation processing procedure shown in FIG. 2(*b*).

Figure 2A:
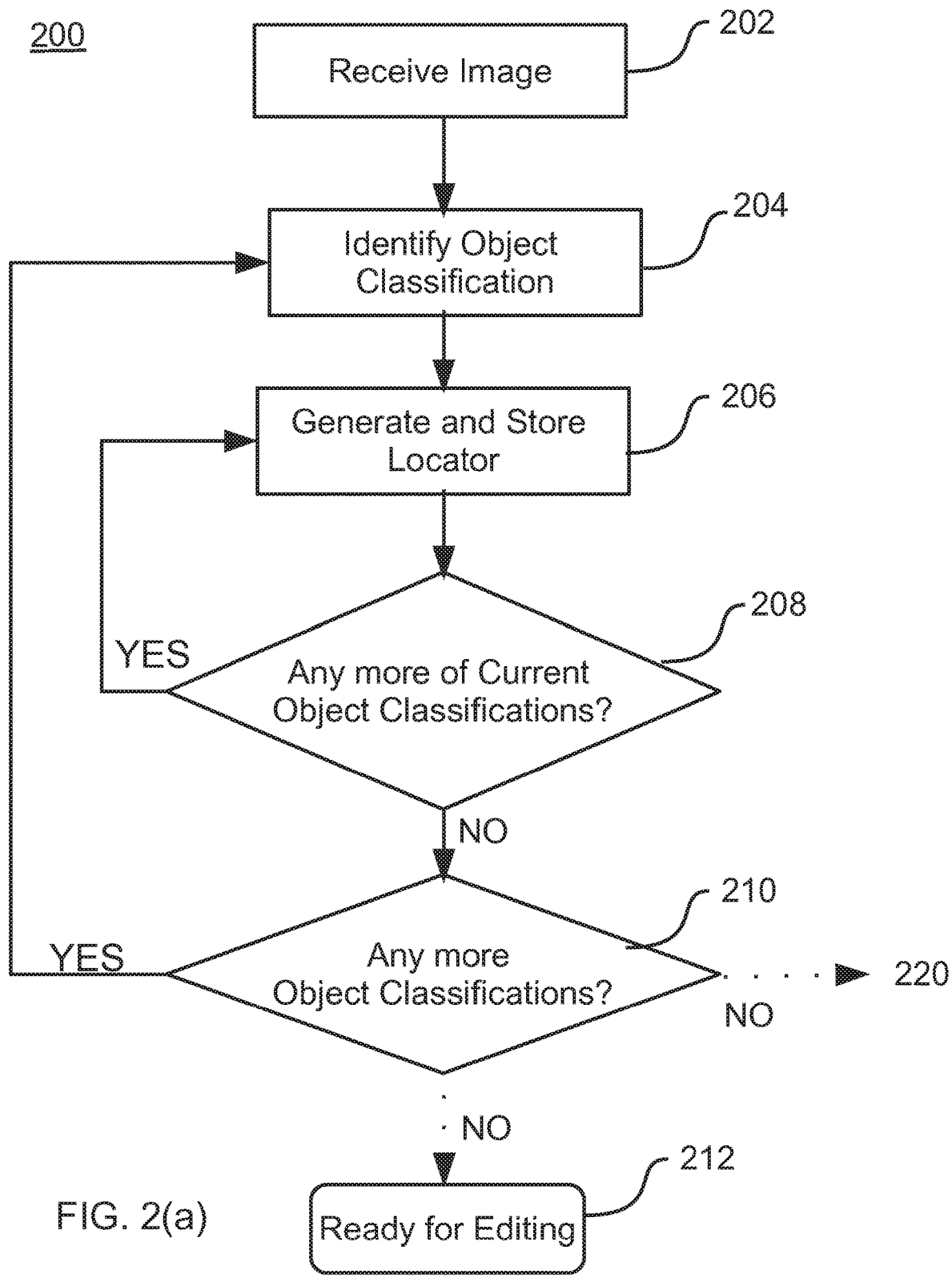
FIGS. 2(a) and (b) are flow diagrams of examples of segmentation of an image.

FIG. 2(*b*) illustrates an example of object segmentation that includes identification of specific object classifications and generic classifications, according to some implementations. Specific object classifications are objects distinguishable by recognition processes and distinctly designate the object under definable semantic names as described above. Specific object classifications should provide a user with an explicit understanding of the object represented. The process for segmenting an image into specific object classifications is shown and described with reference to FIG. 2(a). Generic classifications are any regions of the image that are not segmented by an object classification and may be grouped by general descriptions of their characteristics rather than distinct terms. Some examples of generic classification are based on color and texture. Various techniques may be utilized to segment an image by generic classifications. Some examples of such techniques include objectness, heat map threshold, color contrast, binarized norm gradients (BING), edge density detection, corner detection, blob detection, shadow detection, histogram generation, super pixeling, multiscale saliency etc.

Figure 2B:
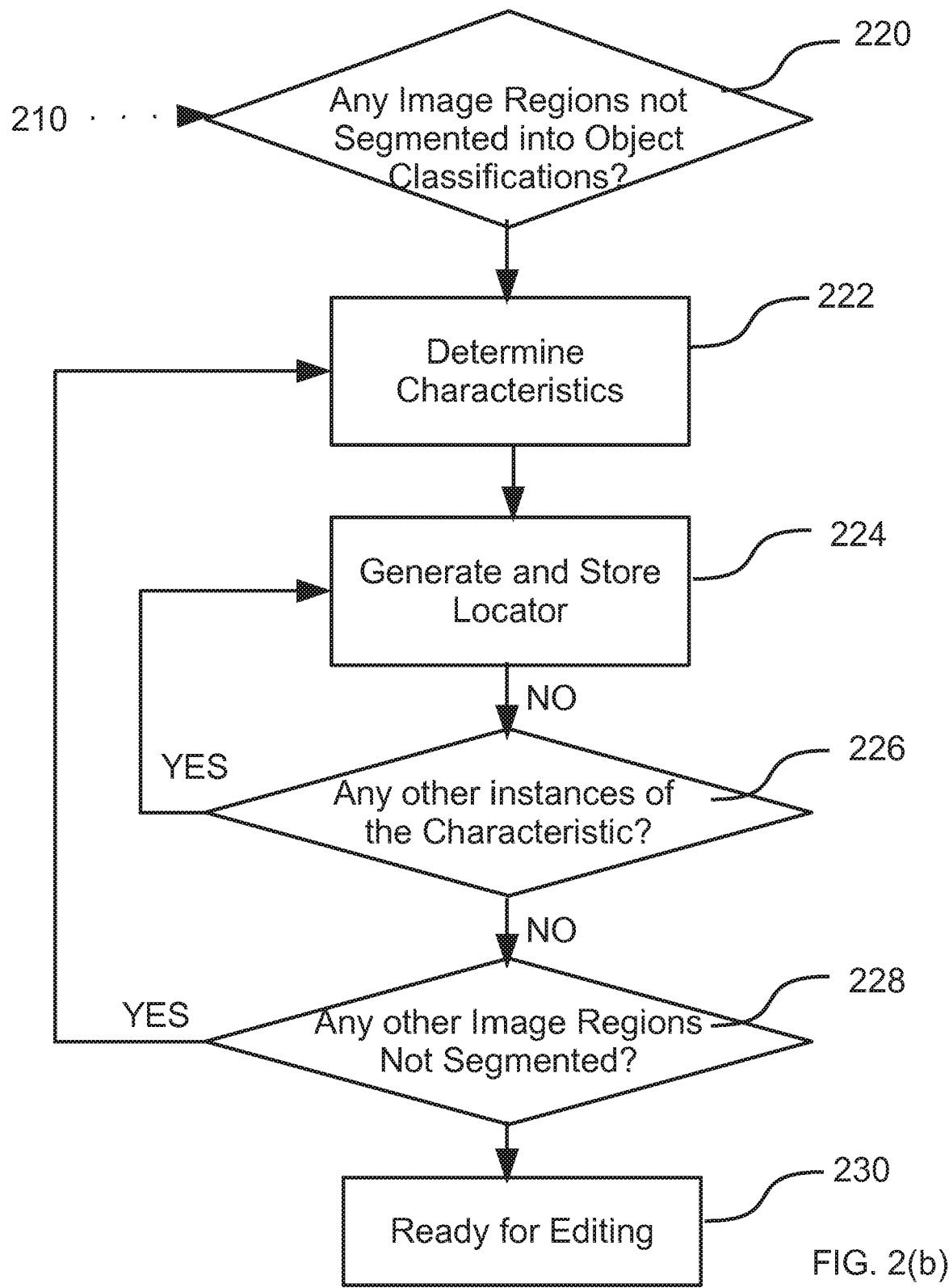

The process shown in FIG. 2(b) begins at decision block 210 of FIG. 2(a) where it is determined that there are no additional object classifications identified in the image. In the case of no more identified specific object classifications, the process proceeds to decision block 220 of FIG. 2(b), in which a determination is made as to whether there are generic image regions not segmented into the specific object classifications. If there is one or more generic regions remaining unprocessed in the image, then one or more characteristics of the generic region is determined in block 222 and a locator corresponding to the current instance of the generic region is determined and stored in block 224. In some implementations, the generic classifications and corresponding locator are stored in index 124 of the memory 122 of the computing device 138. Block 226 decides whether there are any more instances of the current generic characteristic. If there are more instances, the process loops back to step 224. If no more instances are detected, the process proceeds to block 228. Decision block 228 determines whether there are additional generic regions in the image that are not segmented and if so, the process proceeds back to step 224 to determine characteristics of the additional generic region and to step 228 to determine an associated locator indicating the placement, e.g. pixels, of the generic region in the image. If there are no more generic regions, for example, the entire image has been segmented into either object classifications or generic characteristics, the image is fully segmented and ready for editing in block 216.

Figure 3:
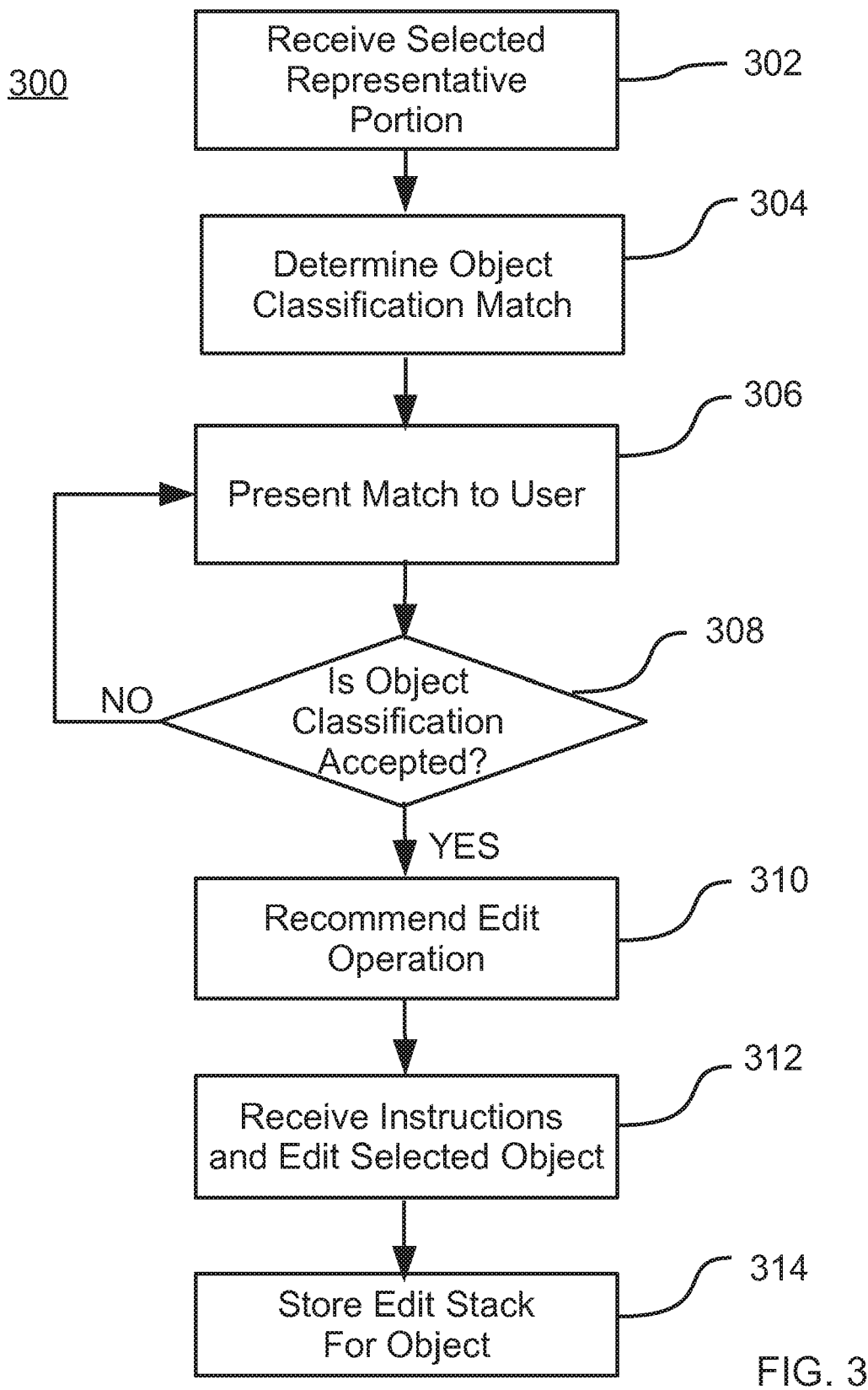
FIG. 3 is a flow diagram of an example of editing objects in a segmented image.

FIG. 3 shows by way of a flow chart, some implementations of the editing phase 600 of the object based editing process, which may be performed by the processor 120 of the computing device 138. Block 302 receives a selection of a representative portion of the image from the user. The indication of a representative portion of the image may be in the form of a click or tap on an object region of the image, a click or tap on an icon representing a particular object classification identified as being in the image during preprocessing, a selection from a list of identified object classifications, and other inputs of a selection. Block 304 determines matched object classifications based on the object data in the object index 124. For example, the process may include finding in the index, a locator corresponding to the region selected on the image. In other implementations, the representative portion is denoted as an object classification provided to and selected by the user and the process looks up the matched object classification and the locators for all instances of the object classification in the object index 124.

Block 306 presents the matched object classification to the user, such as transmitting the classification to the edit device through a network. Decision block 308 includes determining whether the user has accepted the presented object classification for editing. The user may accept the object classification, for example, by activating an edit control on the user interface. To reject the currently presented object classification, the user may, for example, instruct the next object classification be presented. If the user does not accept the currently presented object classification, the process proceeds back to step 306 to present another object or sub-object classification. If the currently presented object classification is accepted, the process may optionally proceed to block 310 to provide edit recommendations, based at least in part on the accepted object classification. In some implementations, no edit recommendations are provided and the process skips from accepting an object classification in block 308 to editing an object in block 312. In some implementations as shown in block 312, in response to instructions received from the user to edit the object represented by the current object classification according to one of the edit operations, the object in the image is edited. For example, the user may select from any combination of the recommended edit operations or enter other non-recommended edit operations. Thus, block 312 transforms the object represented by the selected object classifications according to the edit instructions. In some implementations, the editing in block 312 is performed by one or more devices, for example, editing may accomplished by the processor 120 of the computing device 138 may control an editing application, the processor 814 of editing device 104 may control the editing application 808, described below with regards to FIG. 8, or a third party device may edit the image according to the user instructions.

Should the user desire further editing of different object classifications, the processes described in FIGS. 2(a) and 2(b) may be repeated for the additional object classifications. The finally edited version of the image may be stored in block 314. In some implementations, the unedited original image is preserved. In other implementations, the edited image may be shared with other computer devices, posted on social network sites, further manipulated or put to other uses.

It should be understood that, for any process discussed herein, there may be additional, fewer or alternative steps performed in similar or alternative orders, or in parallel, within the scope of the various implementations unless otherwise stated. In various implementations, operations that are performed in response to another operation are not performed if the prior operation is unsuccessful. Furthermore, steps described as transmitting data from a device to another device includes placing the data into a network intended for the other device. But the other device may not receive the data. Similarly, steps described as one device receiving data from another device may not include the other device transmitting the data.

Figure 4A:
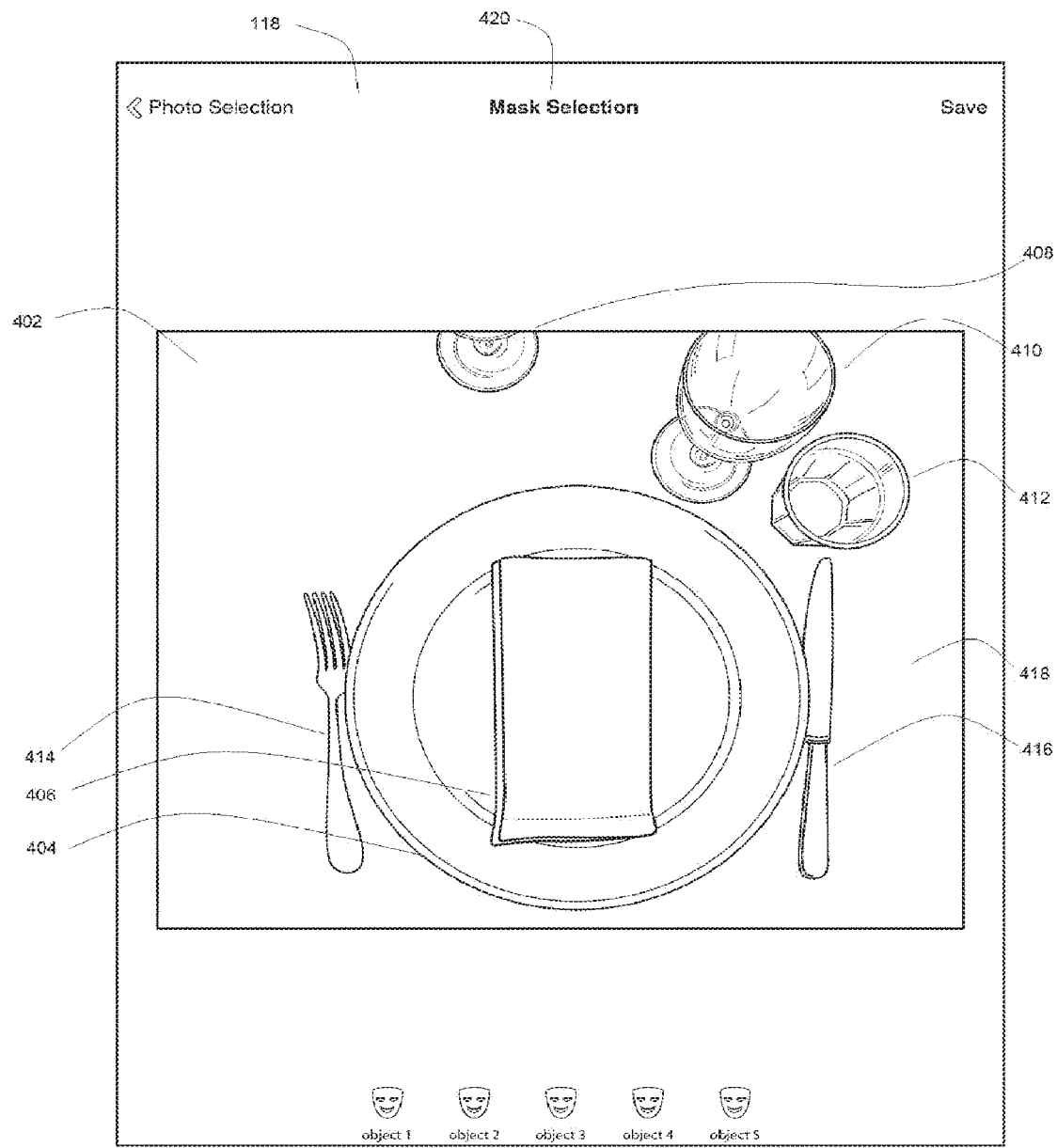
FIGS. 4(a) and (b) are illustrations of an example approach to select various instances of an object classification in an image for editing.
Figure 4B:
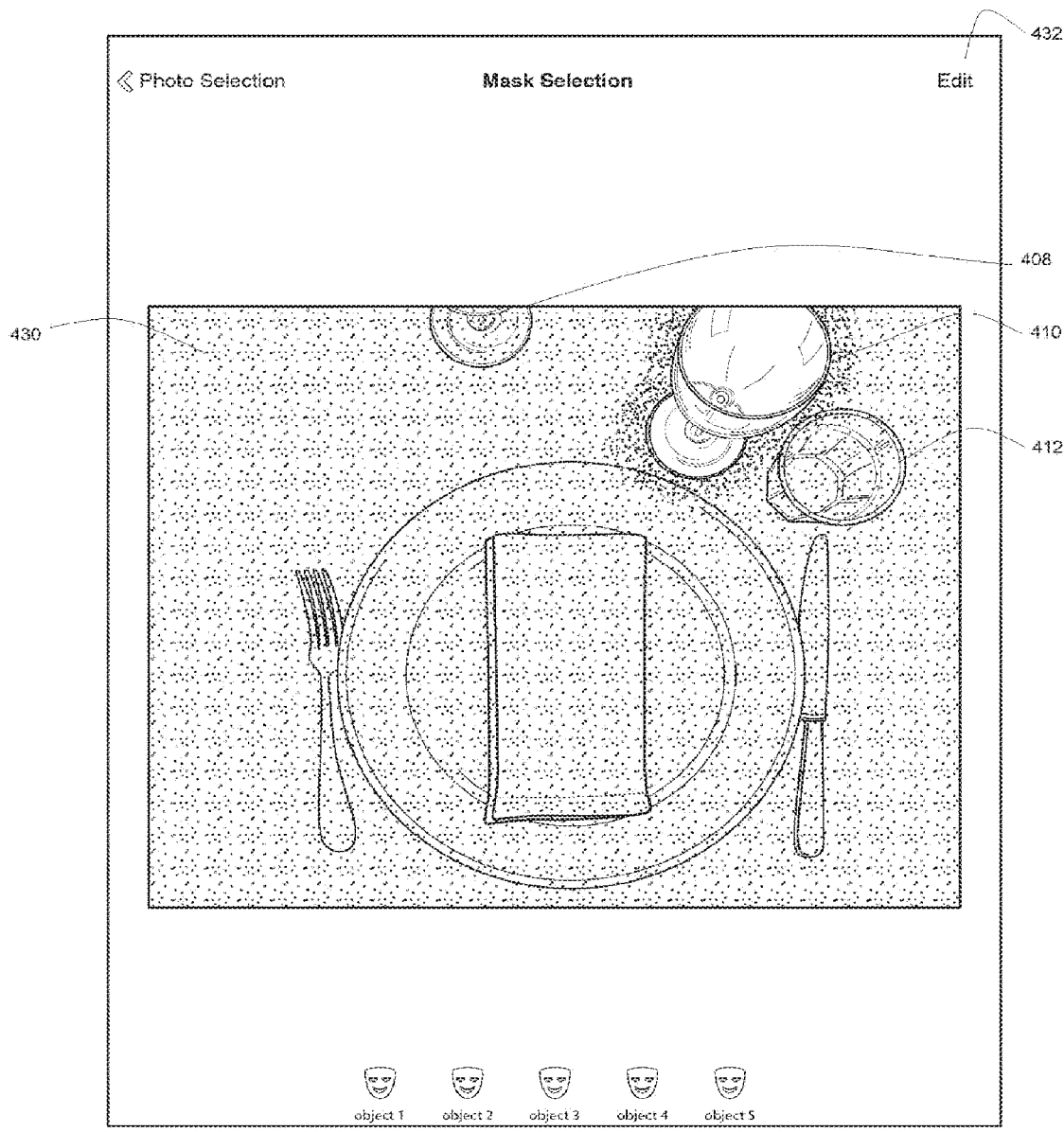

FIGS. 4(a) and 4(b) illustrate an example of an object based editing user interface 118 in which a user opens an image 402 on the graphical user interface 118 of a display screen belonging to an editing device 104. The image in FIG. 4(a) may be segmented into object classification terms: "plate" 404; "napkin" 406; "glass" 408, 410, and 412; "fork" 414; "knife" 416; and "table" 418. A mask selection functionality 420 of the user interface enables the user to tap on a region of the image to select an object classification as a representative portion of the segmented image and thereby select its associated mask.

As shown in the example in FIG. 4(b), the user selected an object classification of a "glass", such as by touching a portion of one of the three glasses in the image 402. An object index 124 of the segmented image identifies three instances of the "glass" object classification. In response to the user's selection, a mask 430 is presented in which one glass 410 of the three glasses 408, 410 and 412 is revealed and available for editing. The remaining portion of the image that does not include the selected object appears shaded by the mask. Thus, the other glasses, plate, napkin, fork, knife and table objects shown in FIG. 4(a) are shaded and not available for editing with the current mask shown. The user may optionally request different masks that show various groupings of the instances of glasses, or an individual instance of one of the "glass" object classifications from the image. For example, by touching the image a second time the user may request another mask that reveals two of the three glasses and by touching again, a third mask may expose all three of the glasses for editing, and so on. The user may choose an object for editing by activating edit control element 432 when a mask is shown that highlights the object or objects that the user would like to edit.

Figure 5A:
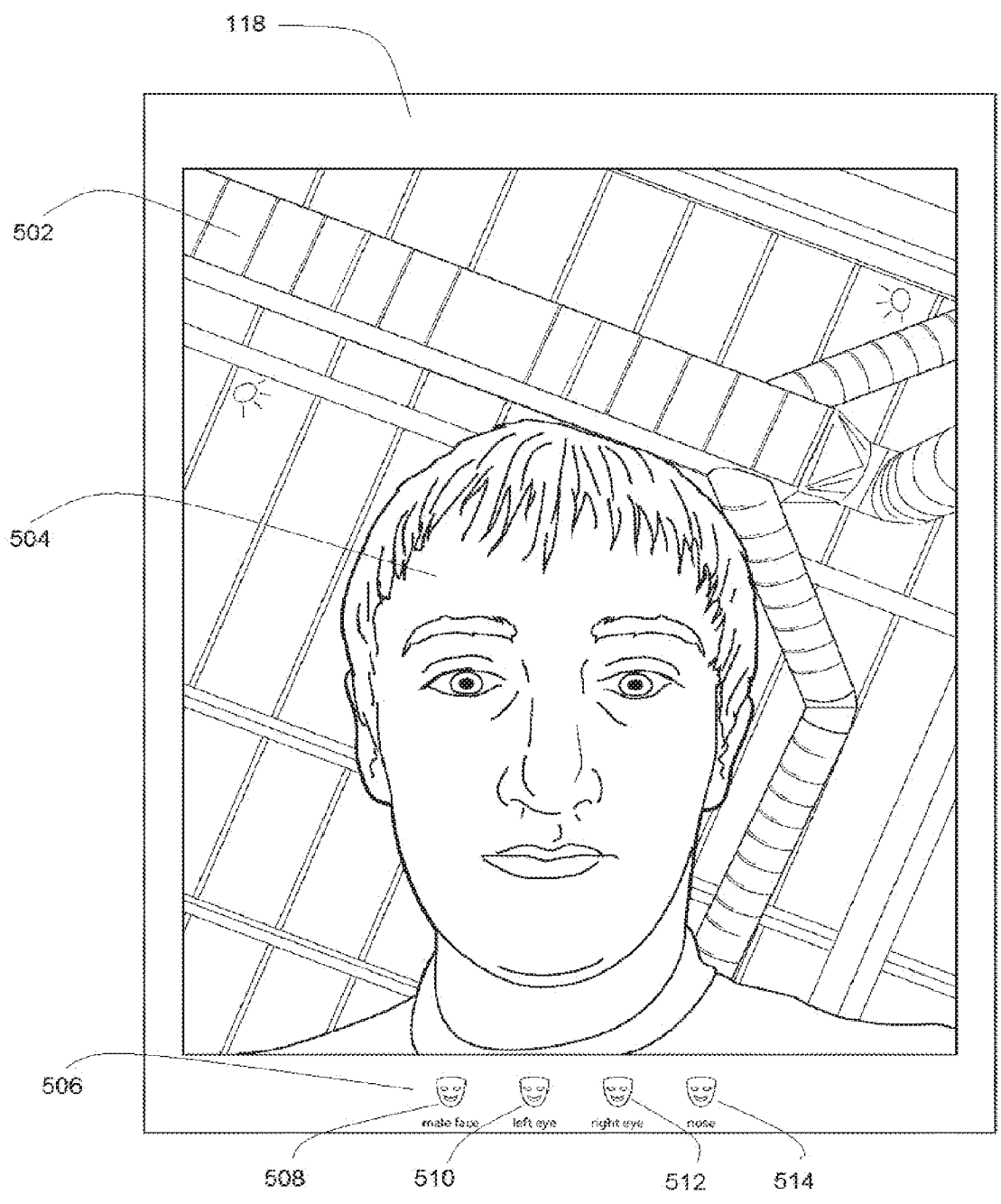
FIGS. 5(a) and (b) are illustrations of an example approach to select various sub-objects in an image for editing.

As demonstrated by FIGS. 5(a) and (b), in some implementations, a user may be presented with optional object and sub-object classifications from which to select objects as a representative portions of the image. In FIG. 5(a), an image 502 shown on a user interface 118 is a selfie type portrait photograph in which an object classification of a male face 504 had been identified during pre-processing image segmentation. Having previously segmented the image into its object classifications, the user is presented with a list of object classifications identified as appearing in the image, from which the user may choose. The classification is presented to the user by a "male face" icon 508 in an object classification icon list 506 on the user interface 118. Image processing additionally identified sub-object classifications, which are presented to the user by a "left eye" icon 310, "right eye" icon 512 and "nose" icon 514 on the user interface 118 in the icon list 506. The user may select from any of classifications in the object classification icon list 506, such as the "nose" icon 514.

Figure 5B:
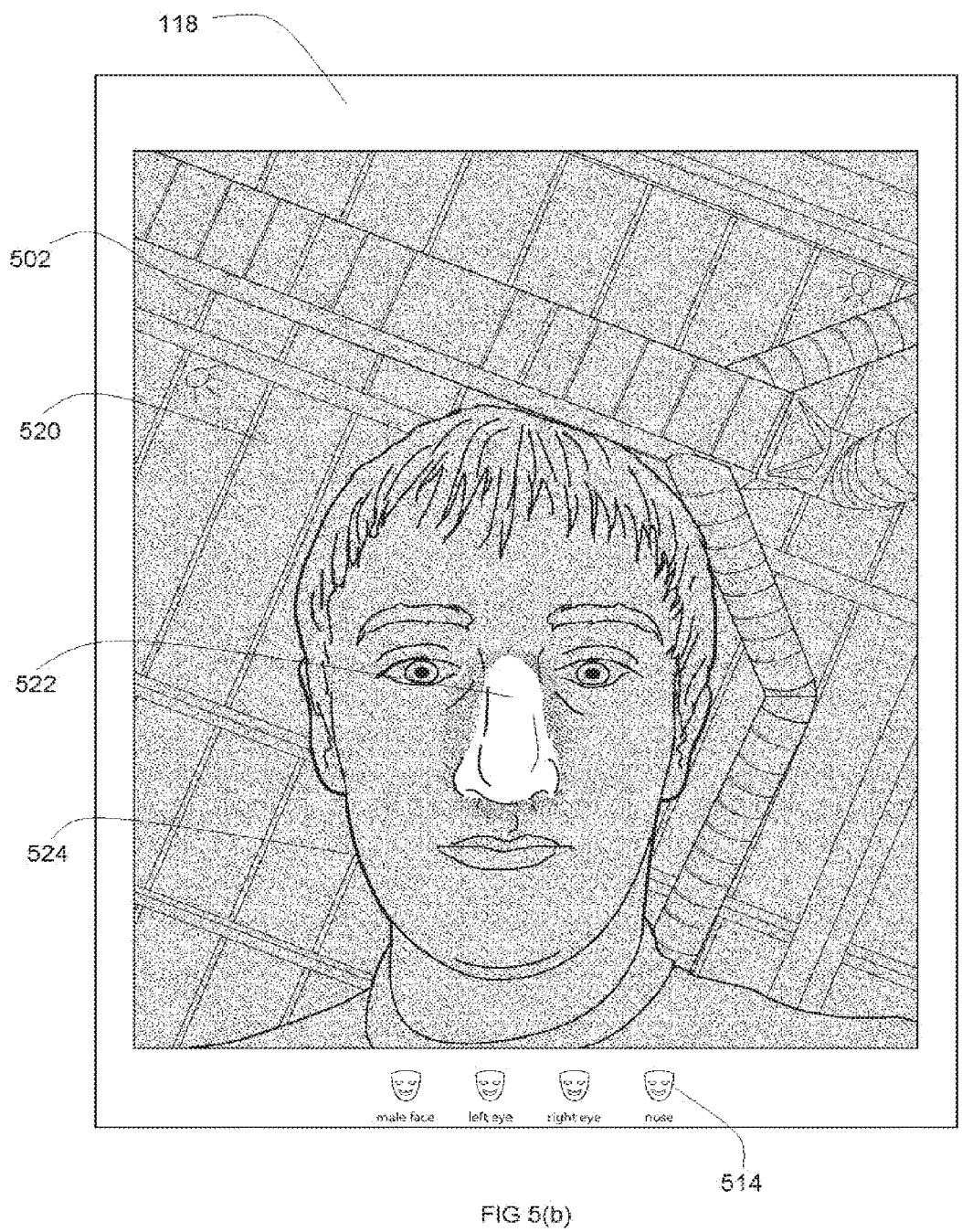

The computing device 138 may respond to selection of the nose icon 514, as shown in FIG. 5(b), by presenting a nose mask 520 on the user interface 118 over the image 504. The nose mask 520 corresponds with object data in an object index 124 of a "nose" sub-object classification and its associated locator. The locator dictates the pixels of the image that the mask reveals. In this example case, the nose 522 of the person in the image is revealed by the object mask 520 and the remainder 524 of the image is shaded, including the unselected portions of the face object. In this case, a grabcut process may have been used to create a nose mask that isolates the nose for editing by the user. By selecting the mask of the nose shown in the current view, the user may proceed with editing this sub-object.

Figure 6A:
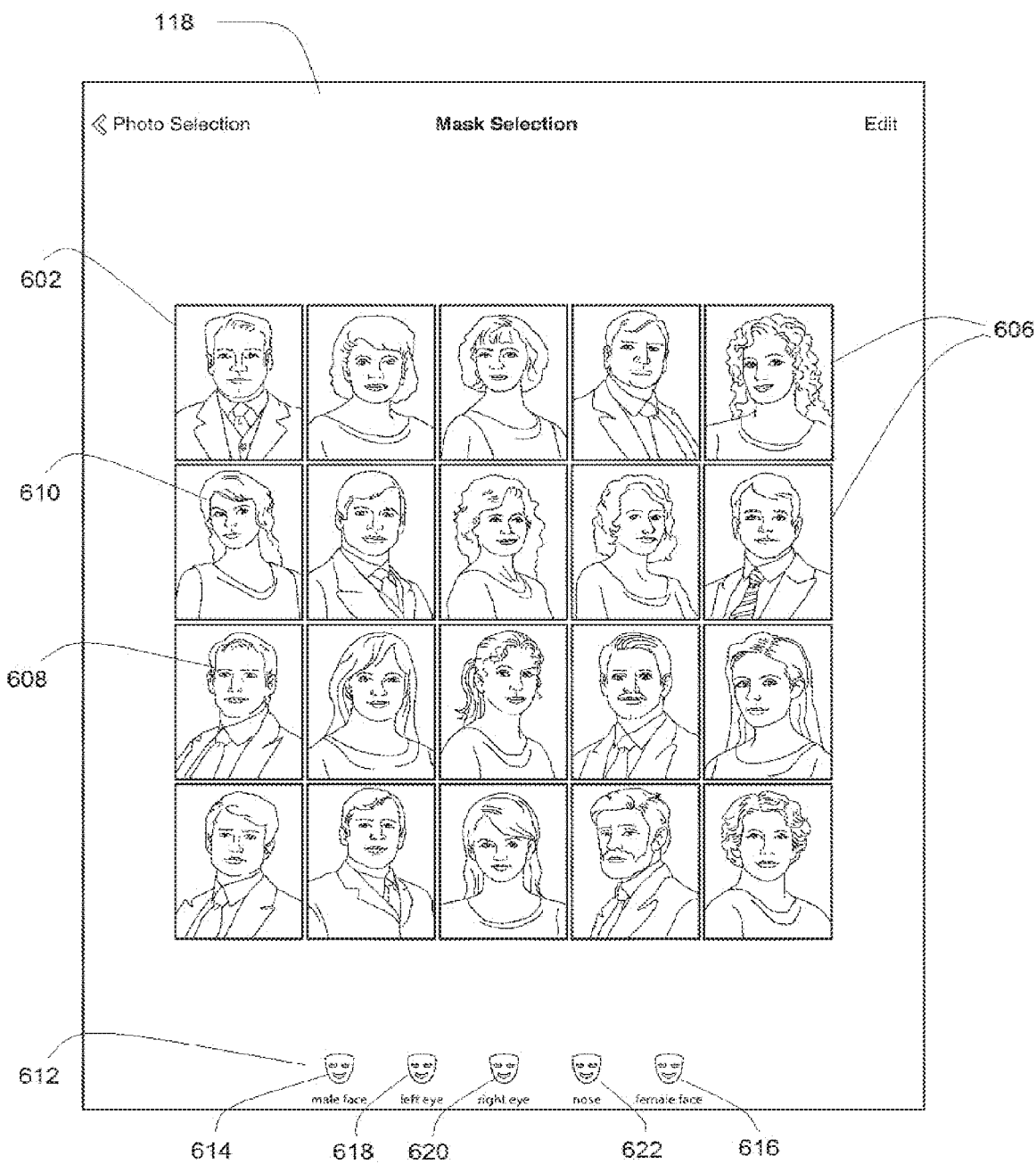
FIGS. 6(a), (b), (c) and (d) are illustrations of an example approach to editing numerous instances of an object classification through object tailored edit recommendations.

FIGS. 6(a), (b), (c), and (d) illustrate a case in which a user is presented with edit operation recommendations on user interface 118 specific to multiple instances of an object classification for editing, according to some implementations. FIG. 6(a) includes a composite image 602 of numerous headshots 606 of different people, queued for editing. In this example, the image 602 may represent persons attending a social event, persons in a social networking group, classmates, coworkers, etc. Pre-processing object segmentation revealed multiple instances of a male face 608 object classification represented by a "male face" icon 614 and various instances of a female face 610 object classification represented by a "female face" icon 616 in an object classification icon list 612. The icon list further includes sub-object classifications represented by a "left eye" icon 618, "right eye" icon 620, and "nose" icon 622, presented on the user interface 118.

In some embodiments, the user may select more than one object and sub-object classifications. For example, the left eye icon and right eye icon may be selected to edit all the eyes of all the faces presented in a given image. This approach may be more efficient than the user being required to separately select each face in an image to edit each individual features such as eyes in the corresponding selected faces. Where the user desires to edit a sub-object classification, such as all female noses, an editing tool that recognizes all male and female faces or noses would be over inclusive by also including male faces or noses. On the other hand, an editing tool that only identifies specific individuals, such as by name, would be under inclusive.

Figure 6B:
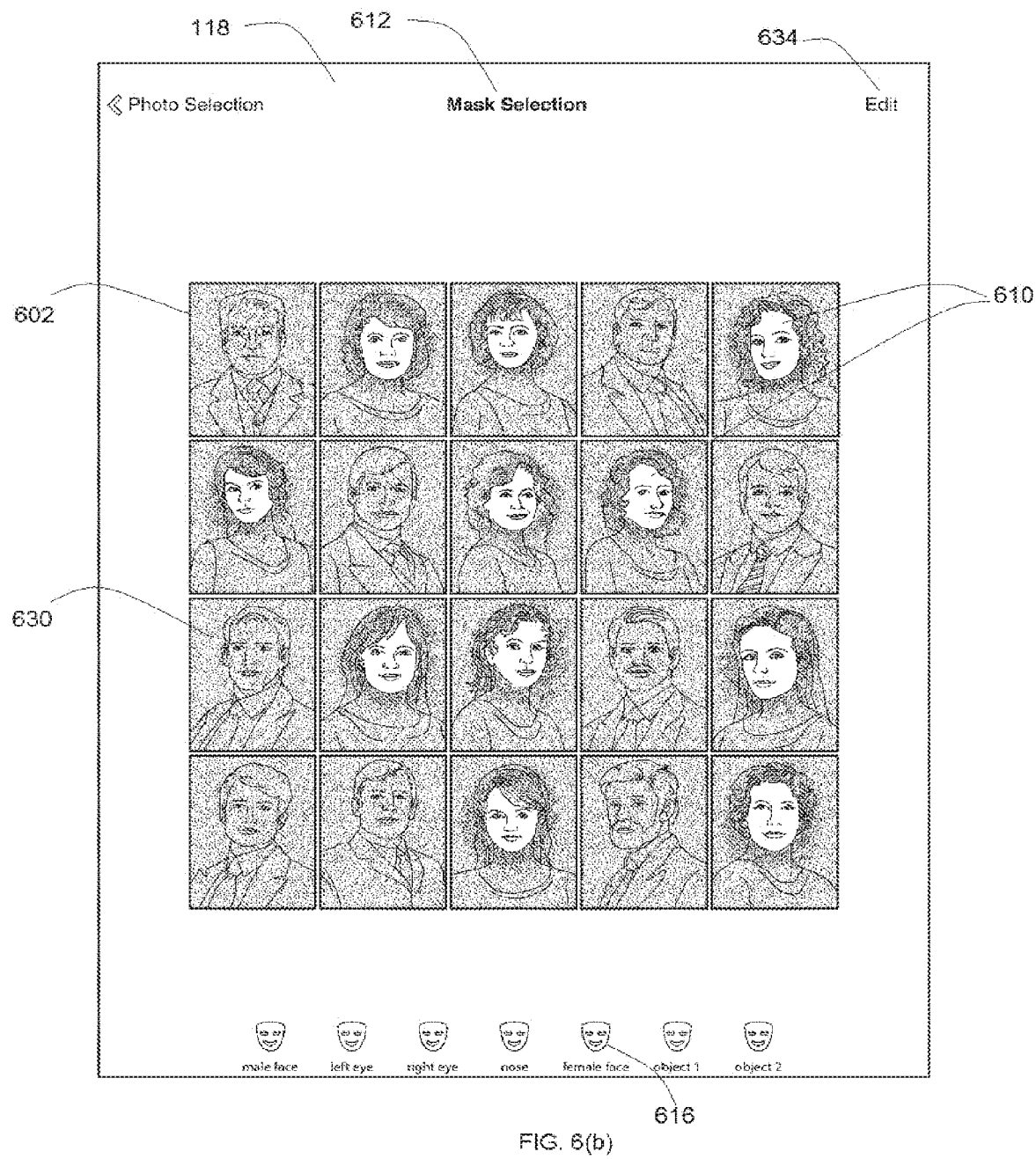

As shown in the example implementation in FIG. 6(b), according to the present object-based editing system, the user may select the "female face" icon 616 on the user interface 118 and receive a mask 630 over the image 602 representing all female faces 610 in the image. The mask selection functionality 632 of the user interface enables the user to select the mask that best represents the objects the user wants to edit. If the objects depicted in the mask are acceptable to the user, the user may activate the "Edit" control element 634.

Figure 6C:
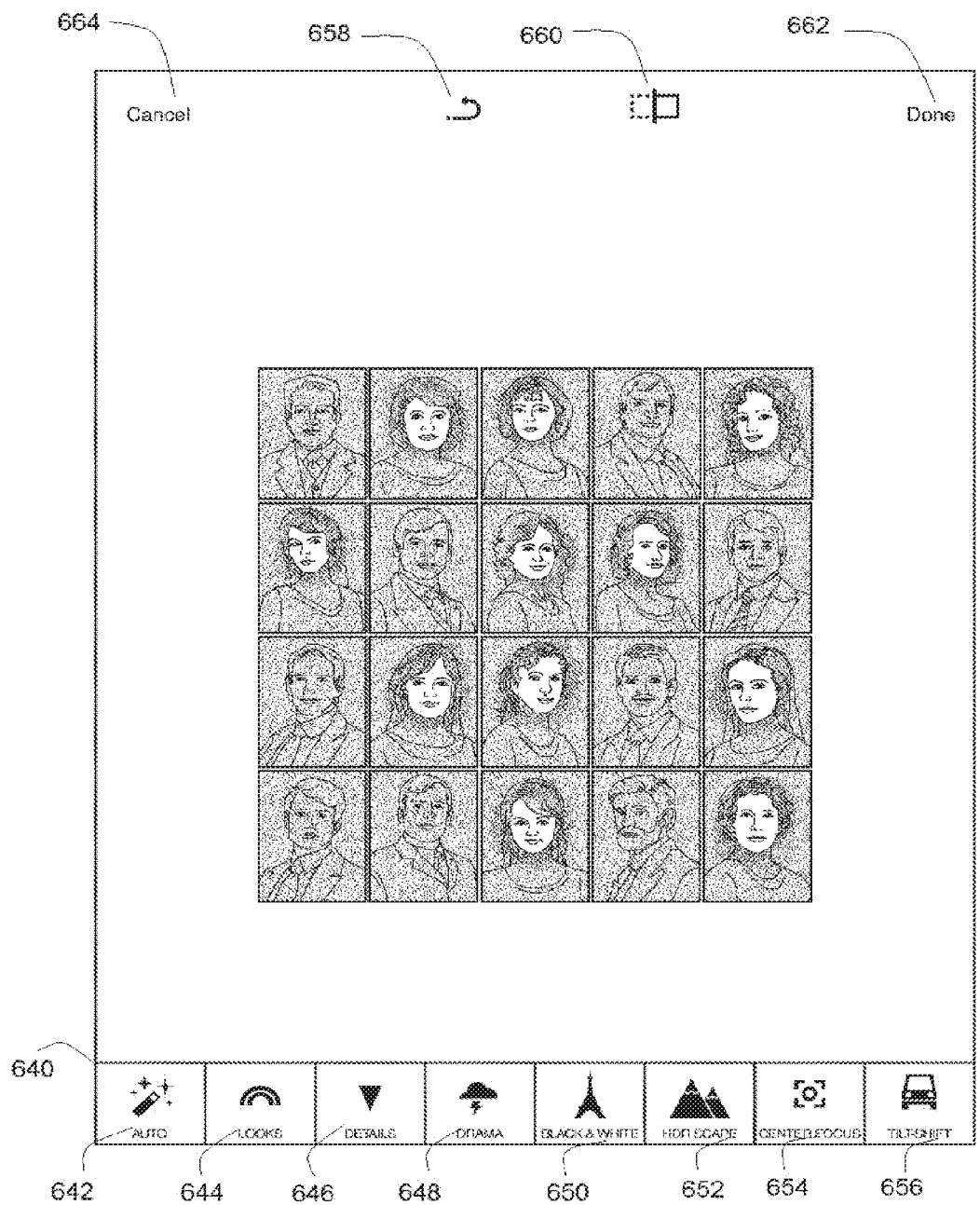

In response to the user accepting the object classification, a list of recommended edit operations 640 are presented on the user interface 118 as shown in FIG. 6(c). In some implementations, the recommended edit operations are provided with each object classification presented. By requesting different masks of objects, the user may be presented with the associated edit recommendation for the current mask.

The edit operations are recommended as operations, such as effects, filters, corrections, cropping, rotations, etc. that are preferred for the selected object classification. The recommended operations may each be individual operations or combinations of operations packaged together into one recommendation. In the example shown in FIG. 6(c), the recommended operations for female faces include the following variety of filters: "auto" 642 for automatically applying default edits particular for the object classification, "looks" 644 for applying an effect that simulates tonality of film for a photographic look to the object, "details" 646 for enhancing and sharpening fine details in the object, "drama" 648 for applying a dramatic look to the object, "black and white" 650 for changing the object to black and white, "HDR scape" 652 for applying a pseudo high dynamic range effect to the object, "center focus" 654 for highlighting at least a portion of the object then applying a vignette and or blurring operation in a radius around it, and "tilt shift" 656 for applying an effect similar to center focus but the vignette and or blurring occurs in parallel areas with a fall off region in between.

The user interface 118 may additionally provide other editing commands, such as an "Undo" control element 658 to remove the current edits and a "Compare" control element 660 to compare the edited version to the unedited image. The user may select the recommended operations and activate the "Done" control element 662 when all operations have been selected. Optionally, the user may activate the "Cancel" control element 664 to refuse the current selection of the object classification.

Figure 6D:
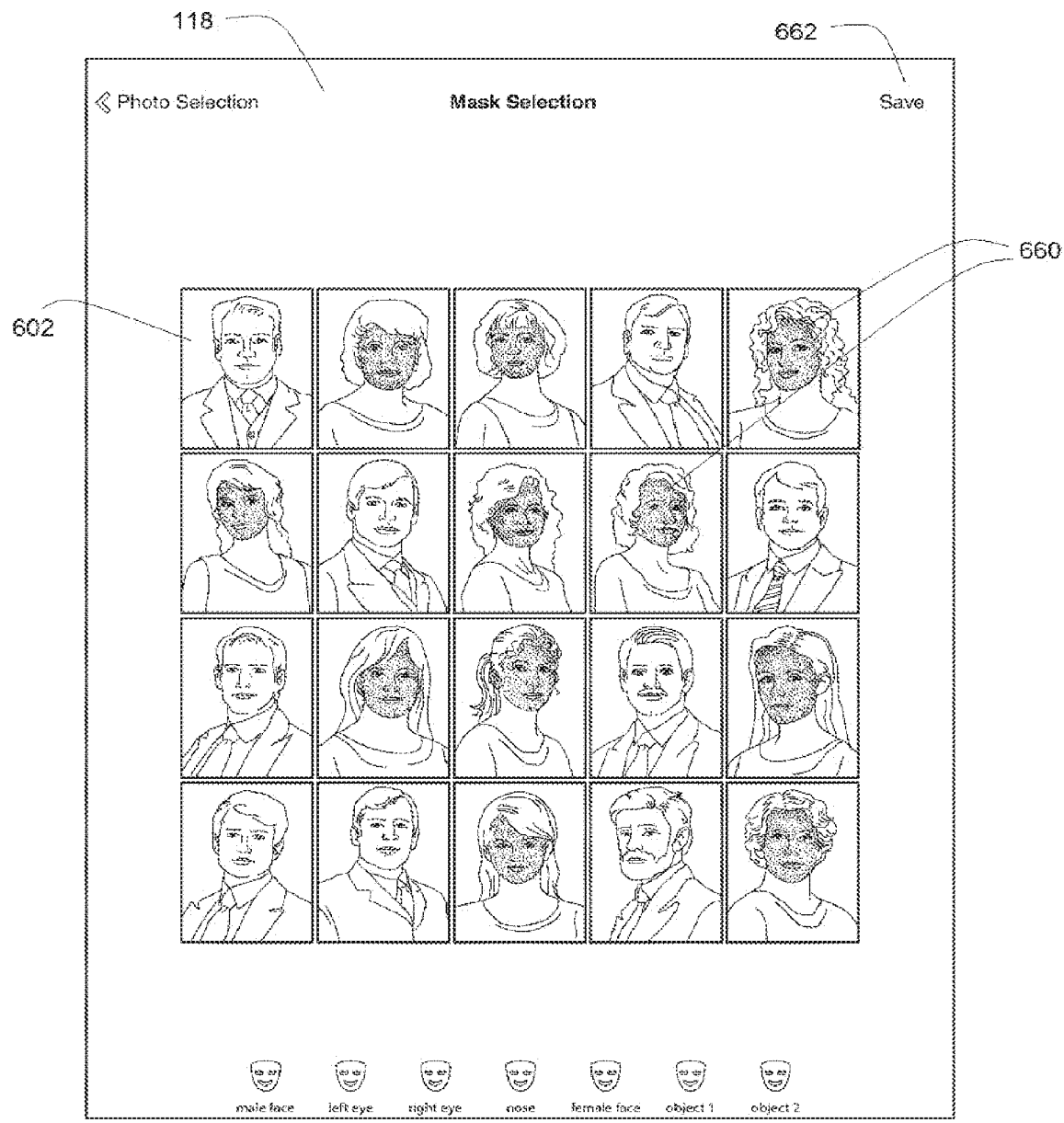

In the example shown in FIG. 6(d), the user selects the recommended black and white edit icon on the user interface. As a result, only the female faces in the image 602 on the user interface 118 are transformed into black and white, as illustrated by the shaded female faces 660 in FIG. 6(d).

The edits may be accepted and stored by the user activating the "Save" control element 662.

Different edit operations may optionally specify particular objects, for example, teeth whitening for teeth objects and blemish removal for face objects. According to various implementations, the edit operations performed on object classifications of an image may be stored in one or more edit stacks for nondestructive and transferable editing. FIG. 7(a) shows one example of an object based edit stack 700. The edit stack may include one or more layers 702, 704, 706, and 708, each layer containing edit operations 712 previously applied to an object classification or sub-object classification 710 representing an object edited in an image. The object and sub-object classifications may include one or more subcategories 714. In other implementations shown in FIG. 7(b), a single edit stack 720 stores multiple edit operations 722 for a single object classification, such as a "person" edit stack. Each layer 724, 726 and 728 may store a different edit operation 722 arranged in an hierarchical order of preference to apply to one or more, or optionally to each of the subcategories 730.

The edit stack may assist in applying the edit operations performed on an object depicted in an original edited image to other images having similar objects of the same object classifications at the same, similar or different locations on the images, e.g. associated locators. The other images may have objects, such as a second image object, identified through object recognition processes and image segmentation, as discussed above herein. The other image object is further identified as a candidate for edit stack editing by having an object classification same or similar to the matched object classification stored in the edit stack. The present object based editing system provides a benefit by attaching edit procedures to an object classification, rather than fixing the edits to regions of an image. Moreover, the object based edit stack enables transferring of edits from a first edited image across images without the need to access the first edited image to determine the edit operations, e.g. filters, applied to the first edited image. The edit stacks may further store the order in which operations were applied to ensure the editing of one or more image mirrors the editing results from another edited image.

In further implementations, as shown by edit stack 720 in FIG. 7(b), an edit stack that includes layers for one or more subcategories 730 of an object classification with its associated edit operations 722 provides a meaningful storage mechanism for edits. The user may choose from a variety of operations to apply to various editing situations. For example, in FIG. 7(b) the object classification of a "person" is further divided into a first layer 724 having a "male" subcategory, with associated edit procedures "teeth whitening", a second layer 726 having an "over 40 years" subcategory with associated edit operations "smoothing", and a third layer 728 having a "Name: Stanley" subcategory, with associated edit operations "blemish removal."

In still other implementations an edit stack may be dedicated to one object classification without regards to subcategories. In this case, each edit stack layer may represent a different edit operation that may be applied sequentially or in various orders to the image. In various implementations, only particular edit operation layers may be selected by the user or as determined by an intelligence learning element, such as based on prior preferences. For example, an edit stack dedicated to faces may include separate operation layers for blemish removal, colorize, insert hat, etc., which may be sequentially applied. The edit operations in each layer may be weighted to assist in determining the edit operations to apply to an image, and especially if the object classifications between images are not a perfect match.

In some implementations of an edit stack, when an original image is loaded, the object classification, and or subcategory, is detected and original edits are applied or recommended for the user to select, by cross referencing the detected object classification with the object classification stored in the edit stack. In various implementations, the unedited version of the original image is retrieved and the edit operations initially performed are reapplied to the unedited original version image. In other implementations, a different image is queued for editing, such as an image taken at a time and setting close to the original image, or an image taken at an entirely different setting and time. Thus, in the latter case, the object being edited will likely be in a different region of the image than the location of the object in the original edited image. The different other image is segmented into its object classifications by the methods described above, where upon it may be determined that the other image has the same object classification as the original edited image by cross referencing the edit stack data. The edit operations previously performed on the matched classification may be presented to the user to choose to accept. In some embodiments, the edit operations of the matched classification are automatically applied.

Figure 8:
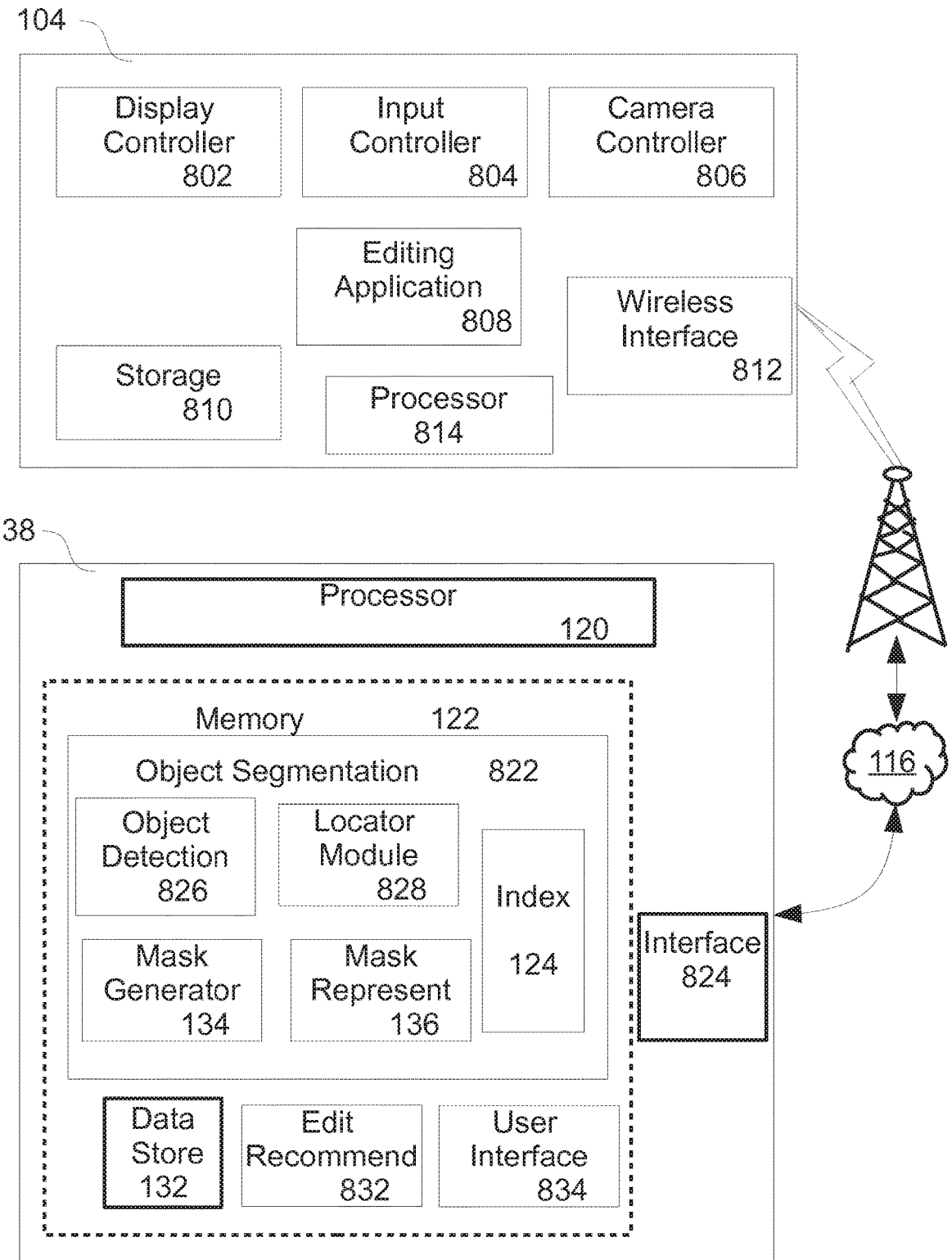
FIG. 8 is a schematic diagram illustrating selected example components of a computing device that implements the object based image editing tool.

In FIG. 8, the editing device 104 and the computing device 138 and at least some of their components are shown, according to some implementation of the object based editing system. The editing device 104 may include one or more controllers, such as a display controller 802 to direct the display, input controller 804 to direct the input element and, in some cases, a camera controller 806 to control the capture of images and a processor 814. The editing application 806 edits images in conjunction with the image processing information and edit recommendations received. Often, an editing device 104 may include a variety of other applications as well. The editing device 104 may also include various storage, such as storage 810 in which the edited and original images may be stored.

The editing device 104 communicates through network 116 from wireless interface 812 to computing device 138 at its interface 820. The computing device 138 may include one or more processors 120 and memory 122. The processor 120 may process instruction for execution within the computing device 138 including instructions stored in memory 122 or on the data store 132. The processor may coordinate computing device components, e.g. applications, wireless or wired communication through interfaces, etc. In some implementations, multiple processors and buses may be used.

The processors 120 and or 814 may be implemented as a chipset of chips that include separate and multiple analog digital processors. The processor may also be implemented using various architectures. For example, the processor 120 may be a CISC (Complex Instruction Set Computer) processor, RISC (Reduced Instruction Set Computer) processor or MISC (Minimal Instruction Set Computer) processor.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems.

The memory 122 stores information within the computing device 138. The memory 122 may be any suitable data storage, memory and/or non-transitory computer-readable storage media, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

The one or more processors 120 and the memory 122 may implement an object segmentation module 822, an edit recommendations module 832, data store 132 and a user interface module 824. In turn, the object segmentation module 822 includes an object index 124 having an object detector module 826 and locator module 828. In some embodiments, the object segmentation module also includes a mask generator 830 and mask representation module 832.

Data store 132 may keep applications and other data. Data store may also be employed to store the original image as well as various edited versions of the image. At least a portion of the information may also be stored on a disk drive or other computer readable storage device (not shown) within the computing device 138. Such storage device include a floppy disk device, a hard disk device, an optical disk device, or a tape device, a flash memory or other similar solid state memory device, or an array of devices.

A computer program, also referred to as programs, software, software applications or code, may also contain instructions that, when executed, perform one or more methods, such as those described herein. The computer program may be tangibly embodied in an information carrier such as computer or machine readable medium, for example, the memory 122, storage device or memory on processor 120. A machine readable medium is any computer program product, apparatus or device used to provide machine instructions or data to a programmable processor.

The computing device 138 may be implemented in a number of different forms. In some implementations, the computing device 138 may be substituted with one or more networked servers, such as servers in a cloud computing network. In some implementations, it may be implemented in a personal computer such as a laptop computer.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time. A number of implementations have been described. Features described with conditional language may describe implementations that are optional. The functional blocks, methods, devices, and systems described in the present disclosure may be integrated or divided into different combinations of systems, devices, and functional blocks as would be known to those skilled in the art. Although the description has been described with respect to particular implementations thereof, these particular implementations are merely illustrative, and not restrictive. Concepts illustrated in the examples may be applied to other examples and implementations. Thus, various modifications may be made without departing from the spirit and scope of this disclosure and other implementations are within the scope of the following claims.

What is claimed is:

1. A computer implemented method to edit an image, the method comprising:
    segmenting a first image into regions depicting objects;
    identifying two or more different classifications descriptive of respective objects of the objects in the first image;
    identifying at least one subcategory for a respective classification of the two or more different classifications, wherein the at least one subcategory has a greater level of specificity than a specificity of the respective classification and the at least one subcategory is represented by a respective semantic term;
    storing locator information for regions of the first image corresponding to the respective objects associated with the at least one subcategory;
    providing to a user device, the respective semantic term of the at least one subcategory; receiving a user selection of at least one semantic term indicating a select subcategory of the at least one subcategory;
    receiving a user request to apply one or more edit operations to at least one instance of an object in the first image associated with the select subcategory; and
    applying the one or more edit operations to the at least one instance of the object in the first image associated with the select subcategory by locating the at least one instance of the object with the location information for the at least one instance of the object.

2. The computer implemented method of claim 1, further including identifying a generic classification of a region of the first image.

3. The method of claim 1, wherein the at least one subcategory includes at least one of a gender, an age, or an identification name of a person classification.

4. The method of claim 1, wherein the select subcategory includes more than one instance of the object associated with the select subcategory and the user selection includes a select number of the instances of the object associated with the select subcategory.

5. The method of claim 1, wherein identifying at least one subcategory includes accessing a database of subcategory terms for the respective classification.

6. The method of claim 1, further including storing the one or more edit operations in a layer of an edit stack, wherein the layer corresponds to the select subcategory.

7. The method of claim 6, further including applying the one or more edit operations from the layer to another object in a second image associated with the select subcategory.

8. A non-transitory computer-readable medium storing instructions that, when executed by one or more processors, cause the one or more processors to perform operations comprising:
    segmenting a first image into regions depicting objects;
    identifying two or more different classifications descriptive of respective objects of the objects in the first image;
    identifying at least one subcategory for a respective classification of the two or more different classifications, wherein the at least one subcategory has a greater level of specificity than a specificity of the respective classification and the at least one subcategory is represented by a respective semantic term;

storing locator information for regions of the firstimage corresponding to the respective objects associated with the at least one subcategory;

providing to a user device, the respective semantic term of the at least one sub category;

receiving a user selection of at least one semantic term indicating a select subcategory of the at least one subcategory;

receiving a user request to apply one or more edit operations to at least one instance of an object in the firstimage associated with the select subcategory; and applying the one or more edit operations to the at least one instance of the object in the firstimage associated with the select subcategory by locating the at least one instance of the object with the location information for the at least one instance of the object.

9. The computer-readable medium of claim 8, wherein the operations further comprise identifying a generic classification of a region of the first image.

10. The computer-readable medium of claim 8, wherein the at least one subcategory includes at least one of a gender, an age or an identification name of a person classification.

11. The computer-readable medium of claim 8, wherein the select subcategory includes more than one instance of the object associated with the select subcategory and the user selection includes a select number of the instances of the object associated with the select subcategory.

12. The computer-readable medium of claim 8, wherein identifying at least one subcategory includes accessing a database of subcategory terms for the respective classification.

13. The computer-readable medium of claim 8, wherein the operation further comprise storing the one or more edit operations in a layer of an edit stack, wherein the layer corresponds to the select subcategory.

14. The computer-readable medium of claim 13, wherein the operation further comprise applying the one or more edit operations from the layer to another object in a second image associated with the select subcategory.

15. A system comprising:
one or more processors; and
one or more computer-readable media having instructions stored thereon that, when executed by the one or more processors, cause performance of operations comprising:

segmenting a first image into regions depicting objects;

identifying two or more different classifications descriptive of respective objects of the objects in the first image;

identifying at least one subcategory for a respective classification of the two or more different classifications, wherein the at least one subcategory has a greater level of specificity than a specificity of the respective classification and the at least one subcategory is represented by a respective semantic term;

storing locator information for regions of the first image corresponding to the respective objects associated with the at least one subcategory;

providing to a user device, the respective semantic term of the at least one sub category;

receiving a user selection of at least one semantic term indicating a select subcategory of the at least one subcategory;

receiving a user request to apply one or more edit operations to at least one instance of an object in the first image associated with the select subcategory; and applying the one or more edit operations to the at least one instance of the object in the first image associated with the select subcategory by locating the at least one instance of the object with the location information for the at least one instance of the object.

16. The system of claim 15, wherein the at least one subcategory includes at least one of a gender, an age or an identification name of a person classification.

17. The system of claim 15, wherein at least one of the at least one subcategory includes more than one instance of an object and the user selection includes a select number of the instances of the select subcategory.

18. The system of claim 15, wherein the select subcategory includes more than one instance of the object associated with the select subcategory and the user selection includes a select number of the instances of the object associated with the select subcategory.

19. The system of claim 15, wherein the operations further comprise storing the one or more edit operations in a layer of an edit stack, wherein the layer corresponds to the select subcategory.

20. The system of claim 19, wherein the operations further comprise applying the one or more edit operations from the layer to another object in a second image associated with the select subcategory.

* * * * *